(12) United States Patent
Xian et al.

(10) Patent No.: US 12,437,172 B2
(45) Date of Patent: *Oct. 7, 2025

(54) ONE SENSOR NEAR FAR SOLUTION TO MINIMIZE FOV MISMATCH AND AIMING OFFSETS

(71) Applicant: HAND HELD PRODUCTS, INC., Charlotte, NC (US)

(72) Inventors: Tao Xian, Mount Laurel, NJ (US); Chen Feng, Mount Laurel, NJ (US); Eric Alfons Youngblood, Matthews, NC (US); Patrick Giordano, Mount Laurel, NJ (US); Paul R. Poloniewicz, Waxhaw, NC (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/667,212

(22) Filed: May 17, 2024

(65) Prior Publication Data

US 2024/0303454 A1    Sep. 12, 2024

Related U.S. Application Data

(63) Continuation of application No. 17/846,470, filed on Jun. 22, 2022, now Pat. No. 12,026,583.

(51) Int. Cl.
*G06K 7/14* (2006.01)
*G06K 19/06* (2006.01)

(52) U.S. Cl.
CPC ..... *G06K 7/1473* (2013.01); *G06K 19/06037* (2013.01)

(58) Field of Classification Search
CPC ................. G06K 7/14; G06K 19/06
See application file for complete search history.

(56) References Cited

U.S. PATENT DOCUMENTS 6,119,071 A * 9/2000 Gorenflo ............ G06K 7/10851
382/173
6,318,637 B1  11/2001 Stoner
(Continued)

FOREIGN PATENT DOCUMENTS

EP    2030067 A2    3/2009
EP    3822702 A1    5/2021

OTHER PUBLICATIONS

Extended European Search Report Mailed on Nov. 22, 2023 for EP Application No. 23174734, 10 page(s).
(Continued)

*Primary Examiner* — Thien M Le
(74) *Attorney, Agent, or Firm* — Alston & Bird LLP

(57) ABSTRACT

Apparatuses, systems, and methods for providing a one sensor near far solution to minimize field of view mismatch and aiming offsets are provided. For example, an indicia reader utilizing dual optics may include an engine comprising a near field imaging optic and a far field imaging optic that split an imaging sensor array and a aimer; wherein the near field imaging optic, the far field imaging optic, and the aimer are configured in a triangular arrangement to minimize the field of mismatch and aiming offsets. In some embodiments, the far field imaging optic may be configured to utilize a two or more prisms to provide a periscope configuration.

20 Claims, 12 Drawing Sheets

(56) References Cited

U.S. PATENT DOCUMENTS

| | | | |
|---|---|---|---|
| 7,014,113 B1 | 3/2006 | Powell et al. | |
| 8,864,034 B1 | 10/2014 | Lei et al. | |
| 9,152,835 B2 | 10/2015 | Meier et al. | |
| 11,009,786 B1 | 5/2021 | Feng et al. | |
| 11,036,944 B1 | 6/2021 | Feng et al. | |
| 2002/0038820 A1* | 4/2002 | Check | G06K 7/10564 235/462.14 |
| 2002/0056816 A1 | 5/2002 | Stark | |
| 2002/0139853 A1* | 10/2002 | Tsikos | G06K 7/10594 235/462.01 |
| 2003/0036204 A1 | 2/2003 | Stark et al. | |
| 2003/0052173 A1* | 3/2003 | Good | G02B 26/10 235/462.32 |
| 2006/0042321 A1 | 3/2006 | Lewis et al. | |
| 2006/0219792 A1* | 10/2006 | Zhu | G06K 7/10881 235/462.06 |
| 2007/0215706 A1* | 9/2007 | Kotlarsky | G06K 7/10851 235/462.07 |
| 2008/0099667 A1 | 5/2008 | Stark et al. | |
| 2008/0193054 A1* | 8/2008 | Lapstun | G06F 3/0321 382/321 |
| 2008/0283603 A1* | 11/2008 | Barron | G06K 7/14 235/454 |
| 2011/0180602 A1* | 7/2011 | Napper | G06K 7/14 235/454 |
| 2011/0180612 A1* | 7/2011 | Lapstun | G06K 7/14 235/494 |
| 2011/0186636 A1 | 8/2011 | Hyde et al. | |
| 2013/0068839 A1* | 3/2013 | Drzymala | G06K 7/1098 235/454 |
| 2015/0347799 A1 | 12/2015 | Gao | |
| 2017/0252859 A1 | 9/2017 | Kumkar et al. | |
| 2017/0276951 A1 | 9/2017 | Kumkar et al. | |
| 2019/0243998 A1 | 8/2019 | Ford et al. | |
| 2020/0188166 A1 | 6/2020 | Buck et al. | |
| 2023/0316023 A1 | 10/2023 | Takashi | |

OTHER PUBLICATIONS

Non-Final Rejection Mailed on Oct. 25, 2023 for U.S. Appl. No. 17/846,470, 11 page(s).

Notice of Allowance and Fees Due (PTOL-85) Mailed on Feb. 20, 2024 for U.S. Appl. No. 17/846,470, 8 page(s).

U.S. Appl. No. 17/846,470, filed Jun. 22, 2022, U.S. Pat. No. 12,026,583, Patented.

EP Office Action Mailed on May 6, 2025 for EP Application No. 23174734, 4 page(s).

* cited by examiner

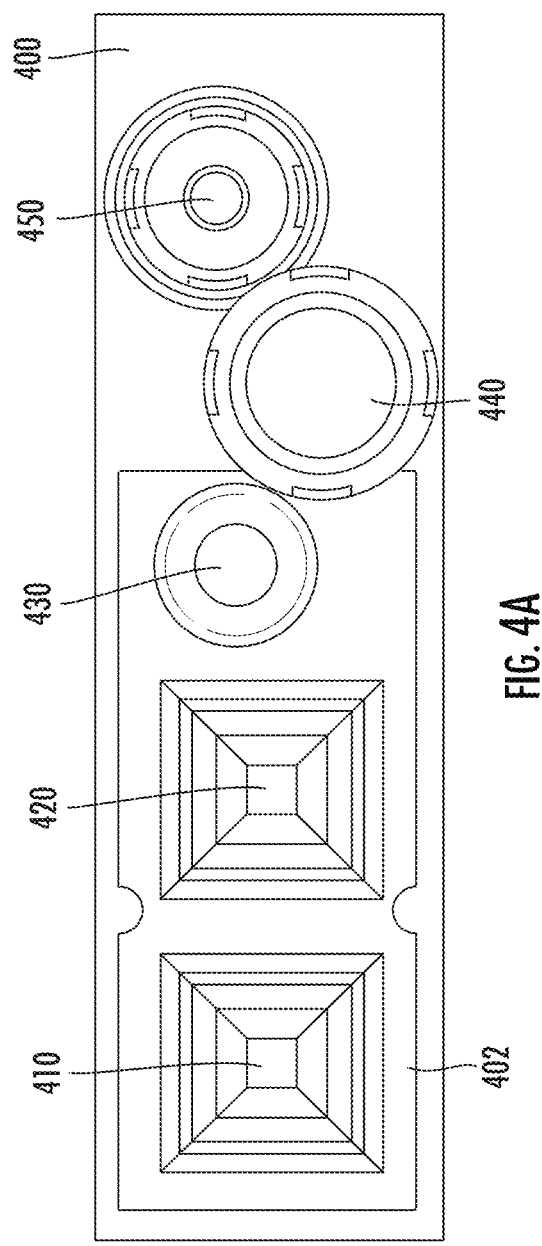

ONE SENSOR NEAR FAR SOLUTION TO MINIMIZE FOV MISMATCH AND AIMING OFFSETS

CROSS REFERENCE TO RELATED APPLICATIONS

This application is a continuation of U.S. patent application Ser. No. 17/846,470, filed Jun. 22, 2022, and entitled "One Sensor Near-Far Solution to Minimize FOV Mismatch and Aiming Offsets," which is incorporated herein by reference in its entirety.

FIELD OF THE INVENTION

Example embodiments of the present disclosure relate generally to dual optics indicia readers and, more particularly, to apparatuses, systems, and method for dual optics indicia readers having a one sensor near-far solution to minimize field of view mismatch and aiming offsets.

BACKGROUND

An indicia reader (e.g., a barcode scanner) is an electronic device that may capture information stored in indicia (e.g., a barcode). Indicia readers may utilize dual optics, such as one optic for capturing indicia in the far field and one optic for capturing indicia in the near field. Such indicia readers traditionally utilize a separate imaging sensor array for each of the far field optic and the near field optic. Additionally, such indicia readers may utilize an aimer centered between the dual optics such that an indicia reader may include a near field optic, and aimer, and a far field optic in a line with the aimer being positioned substantially equidistant between each of the two optics. This linear configuration, including its utilization of multiple imaging sensors, presents technical challenges and difficulties. Applicant has identified many of these technical challenges and difficulties associated with indicia readers, as well as apparatuses, systems, and methods related to barcode readers/scanners.

BRIEF SUMMARY

Various embodiments described herein relate to apparatuses, systems, and method for one sensor near far solution to minimize field of view mismatch and aiming offsets.

In accordance with various embodiments of the present disclosure, an example dual optics indicia reader comprises a near field imaging optic, a far field imaging optic, an imaging sensor array, and an aimer. In some embodiments the near field imaging optic and far field imaging optic are configured to split the imaging sensor array. In some embodiments, the near field imaging optic, the far field imaging optic, and the aimer are in a triangular arrangement. In some embodiments, the near field imaging optic and far field optic are arranged diagonally with respect to the aimer.

In some embodiments, the dual optics indicia reader further comprises a first prism associated with the far field imaging optic and a second prism associated with the far field imaging optic. In some embodiments, the first prism and the second prism are configured to provide a periscope configuration.

In some embodiments, an optical axis associated with the far field imaging optic, an optical axis associated with the near field imaging optic, and an optical axis associated with the aimer are parallel.

In some embodiments, the optical axis associated with the far field imaging optic extending from the dual optics indicia reader, the optical path associated with the near field imaging optic, and the optical path associated with the aimer are perpendicular to a plane of the imaging sensor array.

In some embodiments, a barrel associated with the near field imaging optic and a barrel associated with the far field imaging optic are configured in a nested configuration.

In some embodiments, the dual optics indicia reader further comprises a first illumination source associated with the far field imaging optic, a second illumination source associated with the near field imaging optic, and an illumination optic associated with both the first illumination source and the second illumination source.

In some embodiments, the illumination optic is further associated with the aimer.

In some embodiments, the split of the imaging sensor is equal between the far field imaging optic and the near field imaging optic.

In some embodiments, the split of the imaging sensor is associated with the far field imaging optic is less than the near field imaging optic.

In some embodiments, the split of the imaging sensor is associated with the far field imaging optic is greater than the near field imaging optic.

In accordance with various embodiments, a method for reading indicia comprises capturing indicia imaging data from an indicia via a dual optics indicia reader, wherein the dual optics indicia reader comprises a near field imaging optic, a far field imaging optic, an imaging sensor array, and an aimer, wherein the near field imaging optic and far field imaging optic are configured to split the imaging sensor array, wherein the near field imaging optic, the far field imaging optic, and the aimer are in a triangular arrangement; and wherein the near field imaging optic and far field optic are arranged diagonally with respect to the aimer. The method further comprises decoding the captured indicia imaging data.

In some embodiments, capturing indicia imaging data comprises capturing indicia imaging data from an indicia with a portion of the imaging sensor array.

In some embodiments, capturing indicia imaging data further comprises reading the imaging sensor array for the portion of the imaging sensor array associated with captured indicia imaging data.

In some embodiments, the method further comprises illuminating, prior to capturing indicia imaging data, the indicia with the aimer.

In some embodiments, the method further comprises illuminating, after illuminating with the aimer and prior to capturing indicia imaging data, the indicia with a first illumination source.

In some embodiments, the method further comprises transmitting the decoded captured indicia imaging data to one or more connected devices. In some embodiments, the transmitting is via a wired connection. In some embodiments, the transmitting is via a wireless connection.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which:

FIGS. 4A, 4B, and 4C illustrate views of an example engine for an indicia reader in accordance with example embodiments described herein;

DETAILED DESCRIPTION OF THE INVENTION

Figure 1:
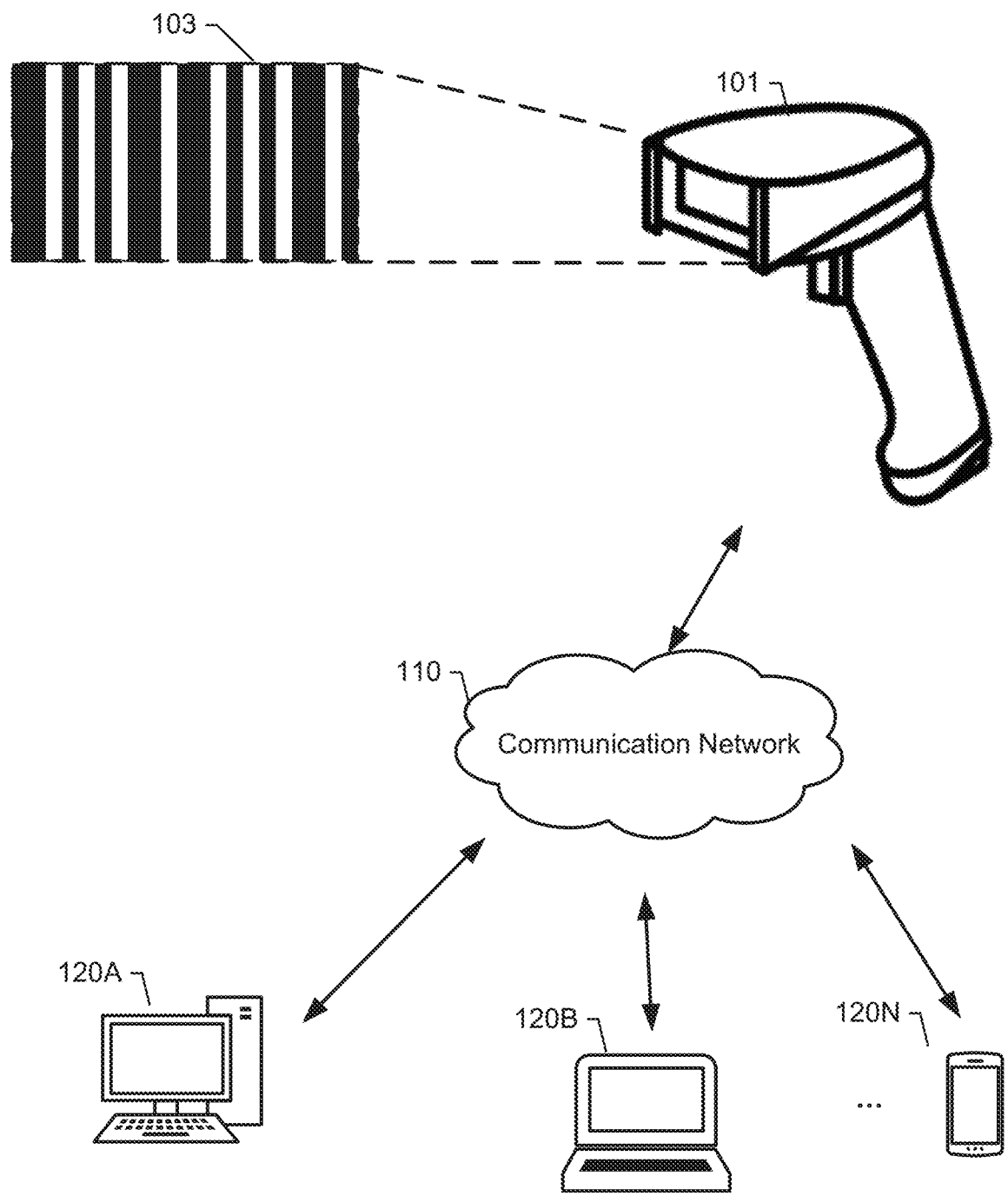
FIG. 1 is an example system diagram illustrating an exemplary system associate with an example indicia reader in accordance with some embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The use of the term "circuitry" as used herein with respect to components of an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements may provide or supplement the functionality of particular circuitry.

The term "electronically coupled," "electronically coupling," "electronically couple," "in communication with," "in electronic communication with," or "connected" in the present disclosure refers to two or more elements, modules, or components being connected through wired means and/or wireless means, such that signals, electrical voltage/current, data and/or information may be transmitted to and/or received from these elements or components.

In the present disclosure, the term "indicia" refers to one or more machine-readable/machine-decodable codes that represent data and information in a visual form that may include, but not limited to, patterns, lines, numbers, letters, and/or the like. Examples of indicia may include, but are not limited to, one-dimensional (1D) barcodes (e.g., UPC, Code 39, Code 128, etc.), two-dimensional (2D) barcodes (Data Matrix, Quick Response (QR), etc.), information-based indicia, Aztec codes, texts (e.g., optical character recognition characters in text or 2D image, etc.), and/or the like. In some embodiments, indicia may be affixed, printed, or otherwise attached to items and/or objects to provide information regarding the item or the object in a machine-readable/machine-decodable format.

In the present invention described herein there are multiple improvements to dual imaging optic architectures for indicia readers. In traditional dual optic architectures of indicia readers, the near field optic has its own imaging sensor array and the far field optic has its own imaging sensor array. Additionally, the near field optic and the far field optic are located in a line with an aimer in the middle. Thus there is an offset between the two imaging systems as well as an offset between the aimer and optics. Thus there are offsets between the optical axis of the aimer and the optical axes of the near field and far field imaging systems. Such offsets create multiple technical challenges and difficulties associated with dual optic indicia readers. For example, the offset between an aimer and one of the optics, such as the far field optic, may cause a user to believe that the user is correctly targeting an indicia to be reader when the optical axis of the optic is offset from the aimer, which may lead to errors in scanning an indicia as the aimer may be the only visual indicator a user may see. While an offset may be small there are multiple situations where this difficulty is substantial, such as where there may be multiple indicia (e.g., multiple barcodes) within the field of view of an optic. For example, there may be a dozen or more barcodes located very close together. Thus the aimer is desired to be as close as the center of the near field and far field images as possible, and the minimization of the distance between the lens center of laser aiming optics to the lens center of each of the near imaging optic and the far imaging optic also effectively reduces aimer offsets. Moreover, traditional architecture's use of a separate imaging sensor for each of the optics requires a larger form factor for an indicia reader, particularly the engine or other components, which traditionally may have a separate PCB for each of the dual optics. Additionally, in dual optics architecture, it is difficult to keep the images from near field and far field in the same field of view or for the near field of view and far field of view to be as close as possible, which reduces the field of view mismatch in the near distance.

Improvements to such traditional dual optic indicia readers are described herein. For example, such improvements include an architectural configuration that allows for a triangular configuration of an aimer, near field optic, and far field optic while utilizing one imaging sensor array to be shared or split by the near field optic and the far field optic. The use of the one imaging sensor, compared to more than one imaging sensor, may allow for a side-by-side arrangement of the near and far field optics, which also reduces separation, and thus offset, between these optics. This architecture's triangular configuration reduces imaging offsets while additionally allowing for a smaller form factor. Moreover, as described herein, the architecture allows for a single PCB to be used with an indicia reader engine, which not only reduces the form factor, but also reduces the number of connectors needed for an engine as there are not multiple PCBs to connect. The use of a single imaging sensor further improves the indicia reader by reducing the number of components as well as processing required for indicia readers with more than one imaging sensor, which would require multiplexing between the various electronics required to capture indicia with the multiple imaging sensors. The elimination of such processes increases, among other things, speed in capturing and decoding indicia. Additional improvements are described herein.

In some embodiments, to capture data and/or information from indicia, an indicia reader may be used. In the present disclosure, the term "indicia reader" refers to a device that reads and/or scans indicia. Examples of indicia readers may include, but are not limited to, barcode scanners, QR code scanners, imaging scanners, area-image scanners, imaging readers, and/or the like. In some embodiments, an example indicia reader may be hand-held (for example, a scanner that can be moved by a user's hand over the indicia being scanned). In some embodiments, an example indicia reader may be fixedly mounted (for example, a scanner that is mounted on top of a counter or a table). In some embodiments, an indicia reader may be hand-held and mounted to a fixedly mounted base and include a hand-held sensor to determine when the indicia reader is being used as a hand-held mode or as a fixed mode.

As an example, a user may trigger an indicia reader (e.g., by pulling a trigger or pressing a button of an indicia reader) to capture indicia imaging data of the indicia. In some embodiments, the indicia imaging data may comprise digital images of the indicia. In some embodiments, the indicia reader may illuminate its field of view with a illumination source (such as, but not limited to, LED generating visible white light or laser light) during image capture, especially in low lighting conditions. In some embodiments, illuminating the indicia during imaging helps ensure that the captured indicia imaging data is suitable for processing.

In some embodiments, after the indicia reader captures the indicia imaging data, the indicia reader may process the indicia imaging data through a processor that is part of the indicia reader. Additionally, or alternatively, after the indicia reader captures the indicia imaging data, the indicia reader may transmit the indicia imaging data to a connected device. As such, various example embodiments of the present disclosure enable the indicia imaging data to be processed through a processor that is either part of the indicia reader or part of a connected device that is communicatively coupled to the indicia reader. In some embodiments, the processor recognizes the indicia from the indicia imaging data and decodes the indicia imaging data according to a type of the indicia (such as, but not limited to, 1D barcodes, 2D barcodes, QR codes and/or the like) and/or a symbology format of the indicia (such as, but not limited to, Code 11, Code 128, and/or the like).

FIG. 1 is an example system diagram illustrating an example indicia reader in accordance with some embodiments of the present disclosure. In the example shown in FIG. 1, the indicia reader 101 may read indicia 103 and also may be in electronic communication with one or more connected device 120A, 120B, . . . 120N via a communication network 110.

For example, the indicia reader 101 may capture and decode indicia imaging data associated with the indicia 103. While the indicia 103 in the example shown in FIG. 1 comprises a barcode, the scope of the present discourse is not limited to the example shown in FIG. 1. As described above, an example indicia in accordance with embodiments of the present disclosure may include additional types of indicia described herein.

In some embodiments, a user may utilize the indicia reader 101 to capture indicia imaging data associated with the indicia 103. For example, a user may trigger the indicia reader 101 by pointing the indicia reader 101 to the indicia 103 and pulling a trigger of the indicia reader 101. In some embodiments, the indicia reader 101 may comprise an imaging component that comprises one or more imaging optics and an imaging sensor. The imaging sensor may capture an image of the indicia 103, and may generate indicia imaging data corresponding to the indicia 103. In some embodiments, the indicia reader 101 may comprise an illumination component that may illuminate a field of view so as to improve the imaging quality of the indicia imaging data.

In some embodiments, the indicia reader 101 may communicate data and/or information (such as, but not limited to, indicia imaging data or indicia information) to the one or more connected devices. In some embodiments, the communication network 110 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the communication network 110 may include an 802.11, 802.16, 802.20, and/or WiMax network. Further, the communication network 110 may include a public network (such as the Internet), a private network (such as an intranet), or combinations thereof, and may utilize a variety of networking protocols including, but not limited to, TCP/IP based networking protocols. For instance, the networking protocol may be customized to suit the needs of the indicia reader 101. In some embodiments, the protocol is a custom protocol of JSON objects sent via a WebSocket channel. In some embodiments, the protocol is JSON over RPC, JSON over REST/HTTP, and the like.

While the description above provides some examples of the communication network that can facilitate data communications between the indicia reader 101 and the connected devices 120A, 120B, . . . , 120N, it is noted that the scope of the present disclosure is not limited to the description above. In some embodiments, the indicia reader 101 may communicate with the connected devices 120A, 120B, . . . , 120N through other means. For example, the indicia reader 101 may communicate with the connected devices 120A, 120B, . . . , 120N through communication protocols such as, but not limited to, general packet radio service (GPRS), Universal Mobile Telecommunications System (UMTS), Code Division Multiple Access 1900 (CDMA1900), CDMA1900 1X (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), Institute of Electrical and Electronics Engineers (IEEE) 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The indicia reader 101 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In some embodiments, the indicia reader 101 may generate one or more decoded data strings based on the indicia imaging data, and may transmit the one or more decoded data strings to the one or more connected devices 120A, 120B, . . . , 120N. Additionally, or alternatively, the one or more connected devices may receive indicia imaging data from the indicia reader 101 and may process the indicia imaging data to generate one or more decoded data strings that correspond to the indicia 103.

Figure 2:
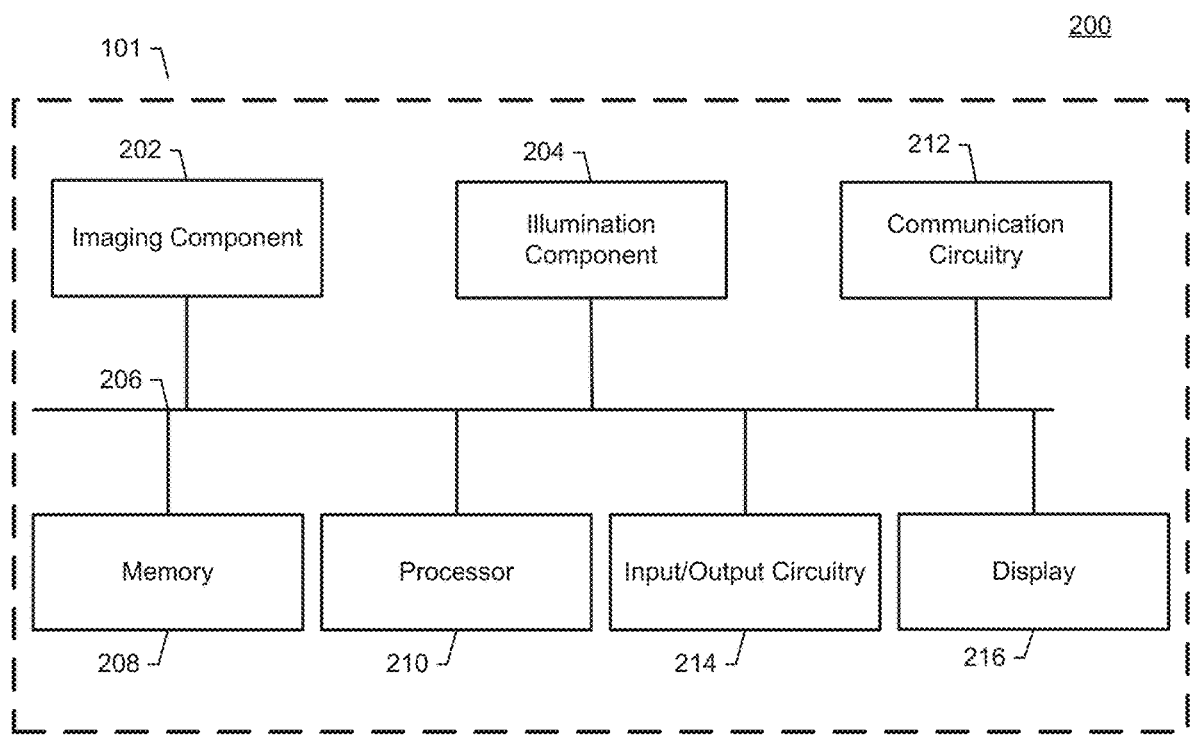
FIG. 2 illustrates an example block diagram of an example indicia reader in accordance with example embodiments described herein.

FIG. 2 illustrates an example block diagram of an example indicia reader 101 in accordance with example embodiments described herein. For example, the indicia reader 101 may comprise apparatus 200 shown in FIG. 2 and may include one or more components or modules that are in electronic commutations with one another. The apparatus 200 may include an imaging component 202, an illumination component 204, a memory 208, a processor 210, and a communications circuitry 212 that are in electronic communication with one another via a system bus 206. In some embodiments, the system bus 206 refers to a computer bus that connects these components so as to enable data transfer and communications between these components. In some embodiments, some or all of these components or modules may be included an engine housed within the indicia reader 101. In some embodiments, an engine may be modular and may allow for replacement of the engine within an indicia reader 101 by another engine in order to provide an indicia reader 101 with different capabilities according to the engine's configuration. In some embodiments, an engine may be connected to the indicia reader with one or more connectors, which may include a data connector, a power connector, and/or a data and power connector.

In some embodiments, the imaging component 202 may comprise one or more imaging sensors including, but are not limited to, a color or monochrome 1D or 2D Charge Coupled Device (CCD), Complementary Metal-Oxide-Semiconductor (CMOS), N-channel Metal-Oxide-Semiconductor (NMOS), P-channel Metal-Oxide-Semiconductor (PMOS), Charge Injection Device (CID) or Charge Modulation Device (CMD) solid state image sensor, and/or the like. In some embodiments, the imaging component 202 may include one or more imaging optics that define a field of view for capturing an image of indicia and generating indicia imaging data.

In some embodiments, the illumination component 204 may include one or more illumination sources and one or more illuminating optics assemblies configured to illuminate the field(s) of view of the imaging component 202, so as to improve the quality of the captured indicia imaging data. In some embodiments, the illumination components 204 may include one or more aimers that provide illumination (e.g., a laser) to indicate where an indica reader 101 is aimed. The aimer may be, for example, a green laser (e.g., VLD) or a red laser. Examples of illuminating optics assemblies may include, but are not limited to, one or more lenses, diffusers, wedges, reflectors, or a combination of such elements, for directing light from illumination source in the direction of the field of view. For example, if the image of the indicia 103 shown in FIG. 1 is to be captured, the illuminating optics assembly may be configured to direct light from an illumination source on to the indicia 103. Some examples of the illumination source may include, but are not limited to, laser diodes (e.g., violet laser diodes, visible laser diodes, edge-emitting laser diodes, surface-emitting laser diodes, and/or the like). Additionally, or alternatively, the illumination source may comprise one or more light-emitting diodes (LEDs). Additionally, or alternatively, the illumination source may comprise one or more other forms of natural and/or artificial sources of light.

In some embodiments, the imaging component 202 and/or the illumination component 204 may be controlled by the processor 210. For example, the processor 210 may transmit electronic instructions to the illumination component 204 via the system bus 206 to trigger the illumination component 204 to illuminate the field of view of the imaging component 202, may transmit electronic instructions to the imaging component 202 to trigger the imaging component 202 to capture indicia imaging data that include one or more images of the indicia, and may receive the indicia imaging data from the imaging component 202.

The processor 210 may be embodied in a number of different ways and may, for example, include one or more processing devices configured to perform independently. Additionally, or alternatively, the processor 210 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

For example, the processor 210 may be embodied as one or more complex programmable logic devices (CPLDs), microprocessors, multi-core processors, co-processing entities, application-specific instruction-set processors (ASIPs), and/or controllers. Further, the processor 210 may be embodied as one or more other processing devices or circuitry. The term circuitry may refer to an entirely hardware embodiment or a combination of hardware and computer program products. Thus, the processor 210 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processor 210 may be configured for a particular use or configured to execute instructions stored in volatile or non-volatile media or otherwise accessible to the processor 210. As such, whether configured by hardware or computer program products, or by a combination thereof, the processor 210 may be capable of performing steps or operations according to embodiments of the present disclosure when configured accordingly.

In an example embodiment, the processor 210 may be configured to execute instructions stored in the memory 208 or otherwise accessible to the processor. Alternatively, or additionally, the processor 210 may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor 210 is embodied as an executor of software instructions, the instructions may specifically configure the processor to perform the algorithms and/or operations described herein when the instructions are executed.

In some embodiments, the memory 208 may be non-transitory and may include, for example, one or more volatile and/or non-volatile memories. In other words, for example, the memory 208 may be an electronic storage device (e.g., a computer readable storage medium). The memory 208 may be configured to store information, data, content, applications, instructions, or the like, for enabling the apparatus 200 to carry out various functions in accordance with example embodiments of the present disclosure. In this regard, the memory 208 may be preconfigured to include computer-coded instructions (e.g., computer program code), and/or dynamically be configured to store such computer-coded instructions for execution by the processor 210.

In an example embodiment, the apparatus 200 further includes a communications circuitry 212 that may enable the apparatus 200 to transmit data and/or information to other devices (such as, but not limited to, the connected devices 120A, 120B, . . . , 120N as shown in FIG. 1) through a communication network. The communications circuitry 212 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 212 may include, for example, a network interface for enabling communications with a wired or wireless communication network. For example, the communications circuitry 212 may include one or more circuitries, network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

In some embodiments, the apparatus 200 may include the input/output circuitry 214 that may, in turn, be in communication with the processor 210 to provide output to the user and, in some embodiments, to receive an indication of a user input. The input/output circuitry 214 may comprise an interface, a mobile application, a kiosk, or the like. In some embodiments, the input/output circuitry 214 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 208). In some embodiments, the input/output circuitry 214 may include a trigger or button that may allow for a user to instruct the indicia reader 101 to capture an image of indicia 103. Additionally, some embodiments may include input/output circuitry 214 such that a user may instruct the indicia reader 101 to select one of multiple imaging optics to utilize, to select one or configure one of multiple illumination components 204 to utilize, and/or to transmit data and/or information to a connected device.

In some embodiments, the apparatus 200 may include the display 216 that may, in turn, be in communication with the processor 210 to display user interfaces (such as, but not limited to, display of indicia or decoded indicia). In various examples of the present disclosure, the display 216 may include a liquid crystal display (LCD), a light-emitting diode (LED) display, a plasma (PDP) display, a quantum dot (QLED) display, and/or the like.

Some examples of the apparatus 200 may include, but are not limited to, an indicia scanner, a handheld scanner, a camera, and/or any other device that is capable of capturing a plurality of images of the indicia and/or generating indicia imaging data of the indicia. Additionally, or alternatively, the apparatus 200 may be in other form(s) and/or may comprise other component(s).

Figure 3:
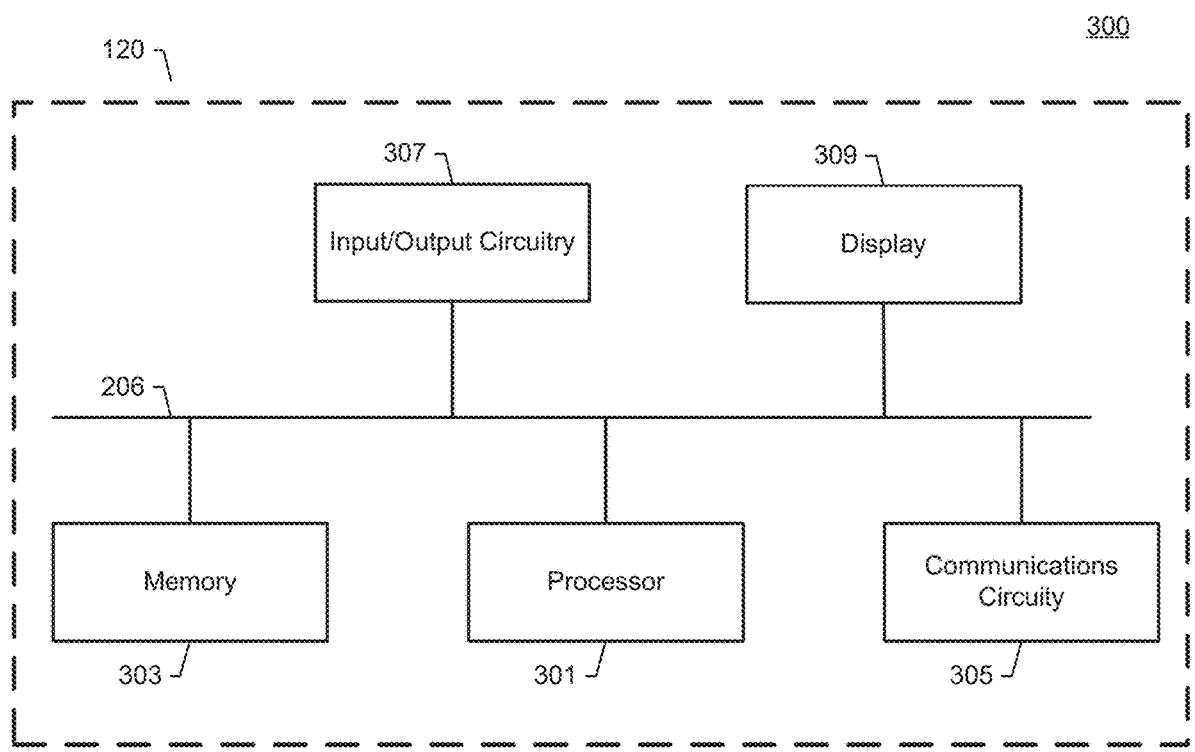
FIG. 3 illustrates an example block diagram of an example connected device in accordance with example embodiments described herein.

FIG. 3 illustrates an example block diagram of an example connected device in accordance with example embodiments described herein. The connected devices 120A-120N of FIG. 1 may include one or more computing systems, such as the apparatus 300 shown in FIG. 3. The apparatus 300 may include a processor 301, a memory 303, a communications circuitry 305, an input/output circuitry 307, and/or a display 309. The apparatus 300 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitries may both leverage use of the same processor, network interface, storage medium, or the like to perform their associated functions, such that duplicate hardware is not required for each set of circuitries.

In some embodiments, the processor 301 may be embodied in a number of different ways and may, for example, include one or more processing devices configured to perform independently. Additionally, or alternatively, the processor 301 may include one or more processors configured in tandem via a bus to enable independent execution of instructions, pipelining, and/or multithreading.

For example, the processor 301 may be embodied as one or more complex programmable logic devices (CPLDs), microprocessors, multi-core processors, co-processing entities, application-specific instruction-set processors (ASIPs), and/or controllers. Further, the processor 301 may be embodied as one or more other processing devices or circuitry. The term circuitry may refer to an entirely hardware embodiment or a combination of hardware and computer program products. Thus, the processor 301 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processor 301 may be configured for a particular use or configured to execute instructions stored in volatile or non-volatile media or otherwise accessible to the processor 301. As such, whether configured by hardware or computer program products, or by a combination thereof, the processor 301 may be capable of performing steps or operations according to embodiments of the present disclosure when configured accordingly.

In some embodiments, the memory 303 may be non-transitory and may include, for example, one or more volatile and/or non-volatile memories. In other words, for example, the memory 303 may be an electronic storage device (e.g., a computer readable storage medium). The memory 303 may be configured to store information, data, content, applications, instructions, or the like, for enabling the apparatus 300 to carry out various functions in accordance with example embodiments of the present disclosure. In this regard, the memory 303 may be preconfigured to include computer-coded instructions (e.g., computer program code), and/or dynamically be configured to store such computer-coded instructions for execution by the processor 301.

In an example embodiment, the processor 301 may be configured to execute instructions stored in the memory 303 or otherwise accessible to the processor. Alternatively, or additionally, the processor 301 may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor 301 is embodied as an executor of software instructions, the instructions may specifically configure the processor to perform the algorithms and/or operations described herein when the instructions are executed.

In some embodiments, the apparatus 300 may include the input/output circuitry 307 that may, in turn, be in communication with the processor 301 to provide output to the user and, in some embodiments, to receive an indication of a user input. The input/output circuitry 307 may comprise an interface, a mobile application, a kiosk, or the like. In some embodiments, the input/output circuitry 307 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 303).

The communications circuitry 305 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 305 may include, for example, a network interface for enabling communications with a wired or wireless communication network and/or in accordance with a variety of networking protocols described herein. For example, the communications circuitry 305 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

In some embodiments, the apparatus 300 may include a display 309 that may, in turn, be in communication with the processor 301 to display user interfaces (such as, but not limited to, display of indicia or decoded indicia). In various examples of the present disclosure, the display 309 may include a liquid crystal display (LCD), a light-emitting diode (LED) display, a plasma (PDP) display, a quantum dot (QLED) display, and/or the like.

Figure 4B:
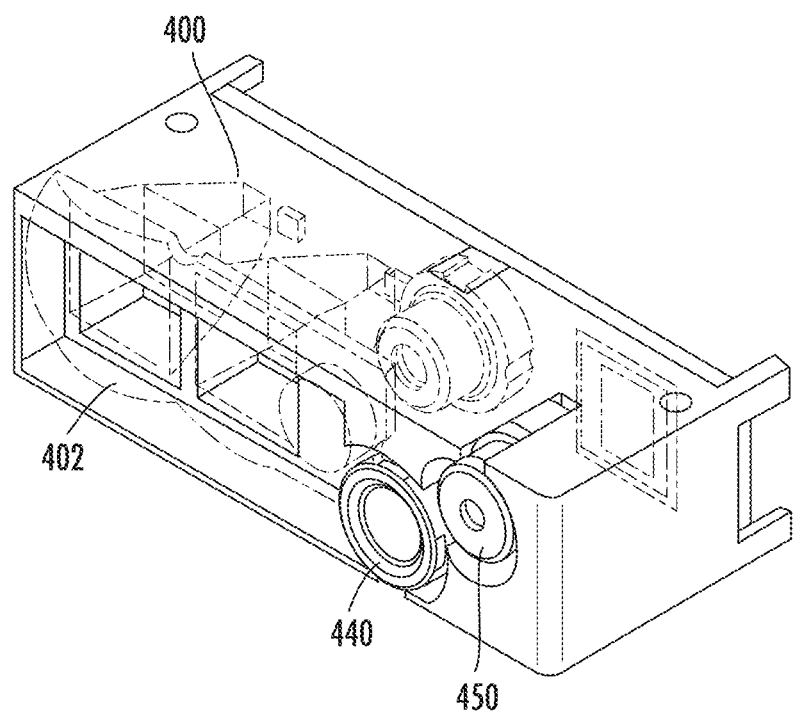
Figure 4C:
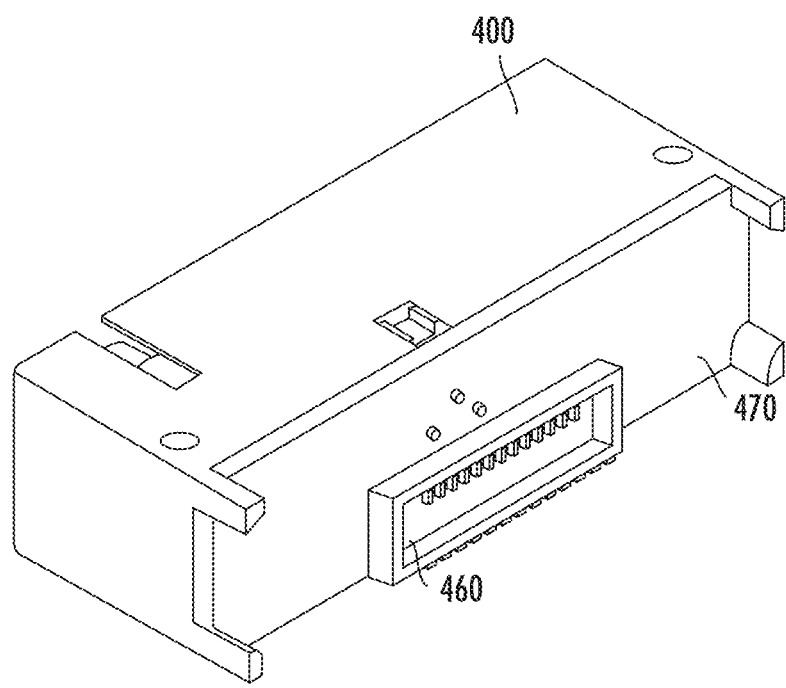

In some embodiments, one or more components or modules of FIG. 2, or portions of these components or modules, may be located in or on an indicia reader engine, which may be referred to as an engine, in the indicia reader 101. FIGS. 4A, 4B, and 4C illustrate different views of an example engine for an indicia reader 101 in accordance with example embodiments described herein.

FIG. 4A illustrates a front view of an example engine 400 for use in an indicia reader 101 in accordance with some embodiments. The engine 400 includes an illumination optic 402, a first illumination source 410, a second illumination source 420, an aimer 430, a far field imaging optic 440, and a near field imaging optic 450. While FIG. 4 illustrates a first illumination source 410, a second illumination source 420, and an aimer 430, alternative embodiments may include fewer or additional illumination sources and/or aimers.

In the embodiment illustrated in FIG. 4A, the first illumination source 410 is associated with the far field imaging optic 440 and the second illumination source 420 is associated with the near field imaging optic 450. The association is such that when the indicia reader 101 is to capture indicia imaging data from an indicia 103, the indicia reader 101 may illuminate the indicia 103 with the first illumination source 410 when the indicia 103 is in the field of view of the far field imaging optic 440 and/or indicia reader 101 may illuminate the indicia 103 with the second illumination source 420 when the indicia 103 is in the field of view of the near field imaging optic 450. In some embodiments, the indicia reader 101 may illuminate the indicia 103 with both the first illumination source 410 and the second illumination source 420 when the indicia is in the field of view of the both the far field imaging optic 440 and the near field imaging optic 450. The location of the indicia 103 may be determined by a ranging component (not depicted), which may or may not operate in conjunction with the aimer 430. In some embodiments, the indicia reader 101 may alternate between the first illumination source 410 and the second illumination source 420 when capturing indicia imaging data from an indicia 103, and in such an embodiment the indicia reader 101 may determine which indicia imaging data that has been captured to use based on a quality of image data decoded.

In the embodiment illustrated in FIG. 4A, the first illumination source 410, the second illumination source 420, and the aimer 430 are behind and are associated with an illumination optic 402 such that the illumination optic 402 may focus or direct illumination from the first illumination source 410, the second illumination source 420, and/or the aimer 430. This may occur with the illumination optic 402 placed in front of the first illumination source 410, second illumination source 420, and aimer 430, which is also illustrated in at least FIGS. 4B and 6. In alternative embodiments, each of the first illumination source 410, second illumination source 420, and aimer 430 may each have their own illumination optic. In a further alternative embodiment, there may be combinations of more than one illumination optics associated with combinations of one or more illumination sources (e.g., 410, 420) and aimer (430). In some embodiments, the illumination optic 402 may be comprised of one or more optical elements.

Each of the far field imaging optic 440 and the near field imaging optic 450 may each include a barrel containing one or more optical elements (e.g., one or more lenses of various types (e.g., convex, concave, etc.)) and/or one or more filters (e.g., IR filter). A barrel may also contain one or more retainers and/or spacers to separate optical elements and/or filters at a specified distance. A filter may be located at the either end of the barrel or in the middle of the barrel, which may be between two or more optical elements. A barrel may also be shaped to accommodate one or more optical elements separate from another optical element by the inner diameter of the barrel increasing or decreasing over the length of the barrel. The outer diameter may increase or decrease over the length of the barrel. In some embodiments, outer diameter of the barrel of the far field imaging optic 440 may be larger at the distal end and smaller at the proximal end while the barrel of the near field imaging optic 450 may be smaller at the distal end and larger at the proximal end such that portions of the barrels may overlap, which may allow for a stacked and/or nested configuration. In some embodiments, a stacked configuration may include one or more portions (e.g., a barrel) of a first optic to be stacked on top of or in front of one or more portions of a second optic (e.g., a barrel). In some embodiments, a nested configuration may include or more portions of a first optic (e.g., its barrel) to be configured to be arranged in the space of one or more portions of a second optic (e.g., its barrel). As illustrated in at least FIGS. 4A, 6, and 7, such configurations may provide for improvements by allowing for, among other things, the optical axis of the far field imaging optic 440 and the optical axis of the near field imaging optic 450 closer together and thus reduce the offset between these axes.

In some embodiments, the barrel of the far field imaging optic 440 and the near field imaging optic 450 may be nested due to configurations of one or more lenses in each barrel. The barrel for the far field imaging optic 440 may include at least two optical elements, with a smaller diameter optical element in the rear of the barrel and a larger diameter optical element in the front of the barrel. The barrel for the near field imaging optic 450 may include at least two optical elements, with a larger diameter optical element in the rear of the barrel and a smaller diameter optical element in the front of the barrel. The overall barrel shape may be configured similarly to the diameter sizes of the optical elements in the barrel. Thus the barrel outer diameter of the far field imaging optic 440 may be larger in front and smaller in back, and the barrel out diameter of the near field imaging optic 450 may be smaller in front and larger in back. These two barrel shapes are complementary to allow the barrels to nest in each other, such as may be readily seen from FIGS. 4A, 6, and 7. Such nesting configurations, including such complementary sizes, reduces the center distance between the far field imaging optic 440 and the near field imaging optic 450. In some embodiments, the barrel of one of the optics may include a cut-out or accommodation to allow for a nesting of a portion of the barrel of the other optic to be nested.

In the embodiment illustrated in FIG. 4A, the aimer 430, the far field imaging optic 440, and the near field imaging optic 450 are configured in a triangular arrangement. As is illustrated, the triangular arrangement may be determined from the center of each of aimer 430, far field imaging optic 440, and near field imaging optic 450. The triangular arrangement includes a nested arrangement of the far field imaging optic 440 and the near field imaging optic 450. The nested arrangement, which is further illustrated in other FIGs, includes portions of the far field imaging optic 440 and the near field imaging optic 450 overlapping in at least one plane.

In some embodiments implementing a triangular configuration, the aimer 430 may be aligned, such as in a horizontal arrangement, with the near field imaging optic 450, such as depicted in FIG. 4A. Additionally, the far field imaging optic 440 may be aligned in a diagonal arrangement with the near field imaging optic 450 and the aimer 430, which may include the far field imaging optic 440 not being located on the horizontal arrangement of the aimer 430 and near field imaging optic 450.

FIG. 4B illustrates an angled view of the front of an example engine 400 in accordance with some embodiments. FIG. 4B illustrates the illumination optic 402 (illustrated with broken lines) in engine 400 and the far field imaging optic 440 and the near field imaging optic 450 on the front of the engine.

In some embodiments, the illumination optic 402 may consist of three portions: a first illumination source 410 portion, a second illumination source 420 portion, and an aimer 430 portion. The front of each portion may have a different shape. In some embodiments, the front of the first illumination source 410 portion and the second illumination source 420 portion may be convex and the aimer 320 portion may be a different shape. The first illumination source 410 portion and the second illumination source 420 portion may include light pipe to conduct and distribute light from the respective sources to the front of the respective portions of the illumination optic 402. The use of light pipes may improve the transmission of illumination from an illumination source on a PCB in the rear of the engine 420, which may allow the first illumination source 410 and the second illumination source 420 to share a PCB with other components as described herein. In some embodiments, the illumination optic 402 may one solid piece (e.g., formed from injection molded plastic). In alternative embodiments, the illumination optic 402 may include a plurality of optical elements.

FIG. 4C illustrates an angled view of the rear of an example engine 400 in accordance with some embodiments.

FIG. 4C illustrates a printed circuit board (PCB) 470, and a connector 460 on the rear side of the PCB 470. In some embodiments, connector 460 may be an electrical connector with one or more pin to mate to a complimentary connector from another component or module of indicia reader 101.

Figure 5:
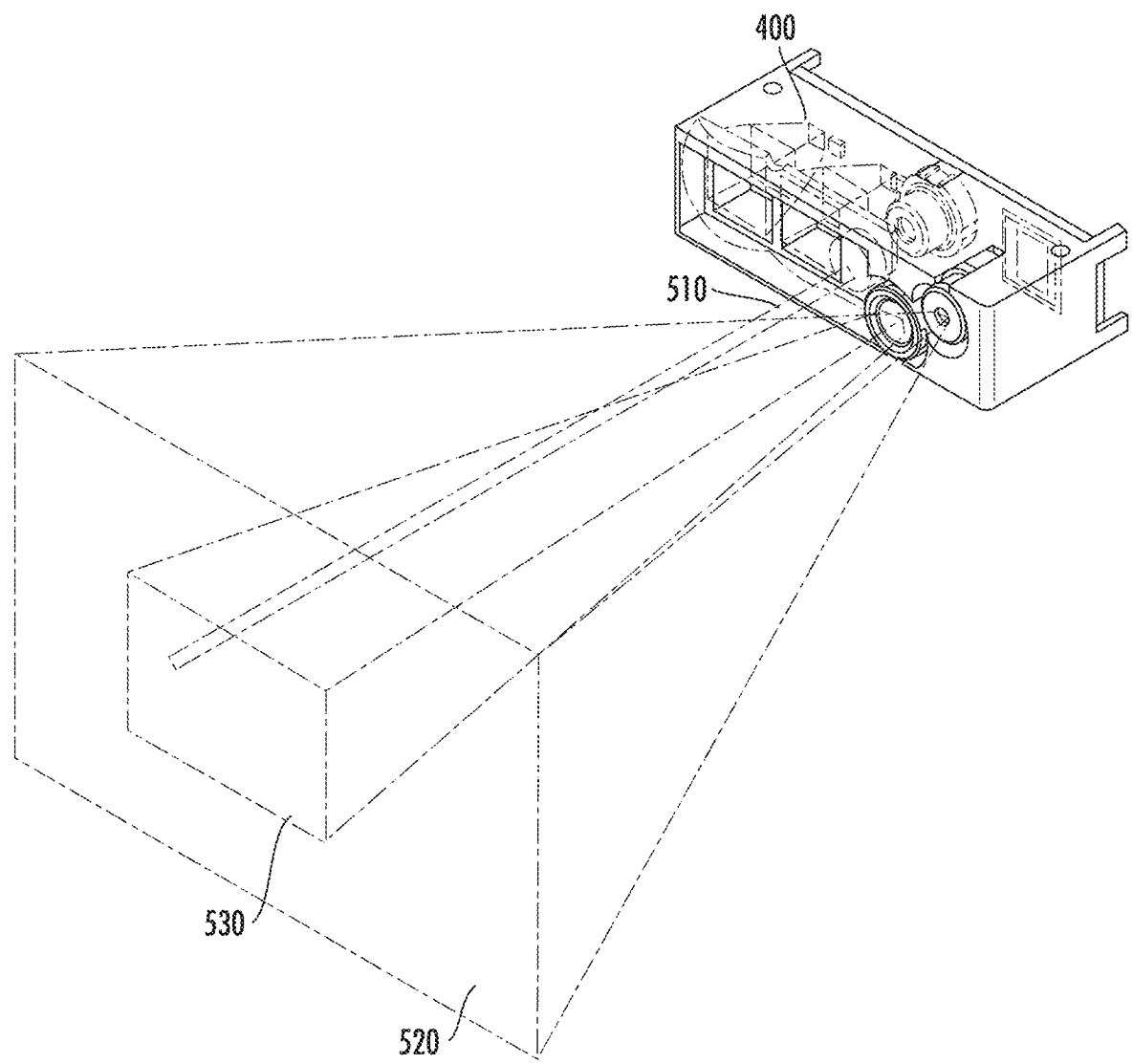
FIG. 5 illustrates an example of fields of view in accordance with example embodiments described herein.

FIG. 5 illustrates an example of fields of view in accordance with example embodiments described herein. FIG. 5 illustrates an embodiment of engine 400 with an aimer beam 510, a near field optical field of view 520, and a far field optical field of view 530. As illustrated in the embodiment of FIG. 5, the optical axis of the aimer beam 510, far field imaging optic 440, and near field imaging optic 450 extending from the engine 400 are parallel. As will be readily appreciated from the embodiment illustrated in FIG. 5, the triangular configuration of the aimer 430, far field imaging optic 440, and near field imaging optic 450 allow for an improved overlap of the near field optical field of view 520 and far field optical field of view 530 such that both of these fields of view cover the same area closer to the engine 400 and also such that the aimer beam 510 has greater accuracy by illuminating an indicia within the field of view of both the far field imaging optic 440 and the near field imaging optic 450 at a closer range.

Figure 6:
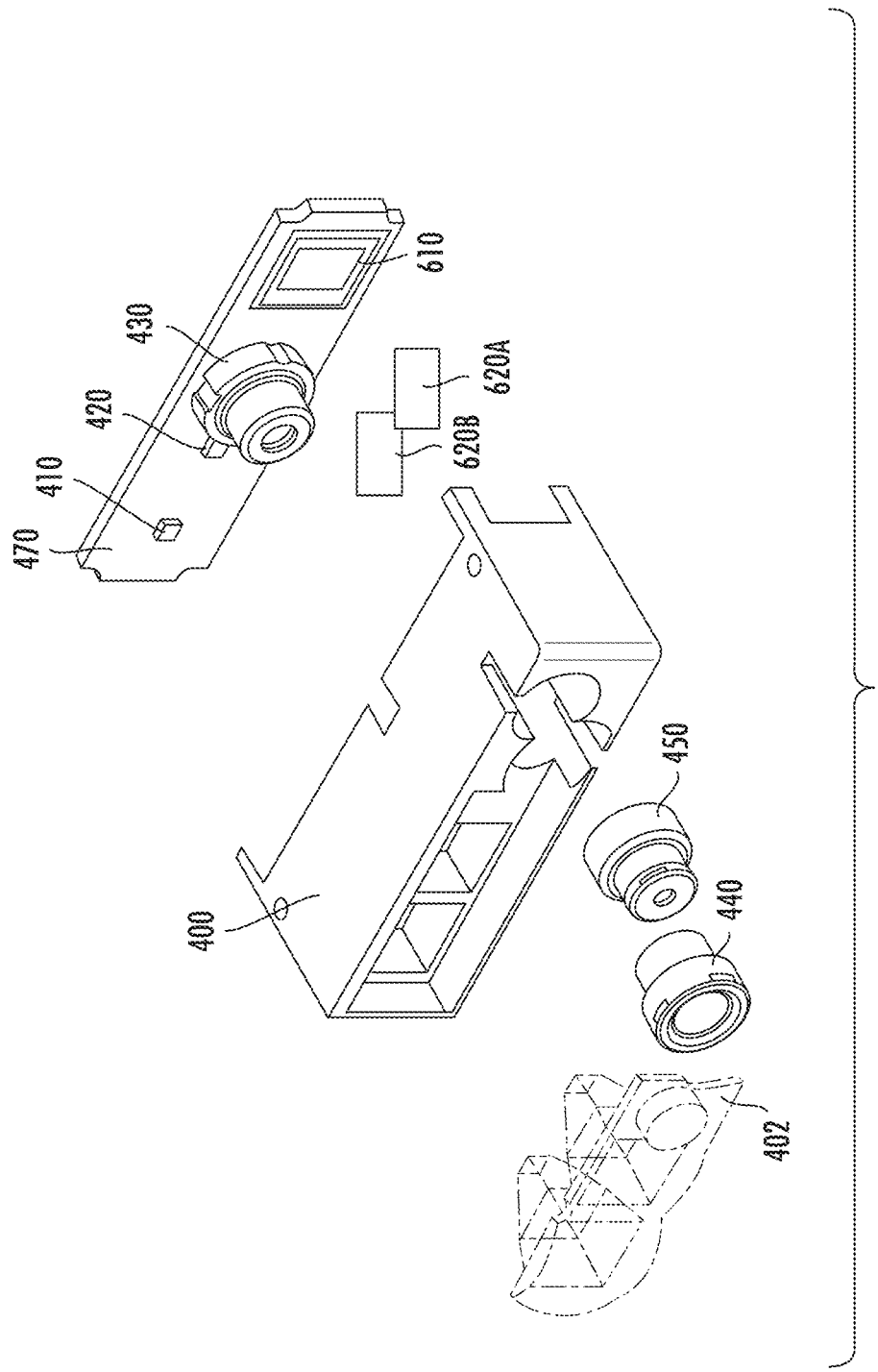
FIG. 6 illustrates a view of an example engine for an indicia reader in accordance with example embodiments described herein.

FIG. 6 illustrates a view of an example engine for an indicia reader in accordance with example embodiments described herein. In the embodiment illustrated in FIG. 6, the engine 400 is illustrated in an exploded view to illustrate the illumination optic 402, the far field imaging optic 440, and the near field imaging optic 450 in addition to PCB 470 and the first illumination source 410, second illumination source 420, aimer 430, imaging sensor array 610 on the front of PCB 470. Additionally illustrated in FIG. 6 are a first mirror 620A and a second mirror 620B, which will be readily appreciated to be located in engine 400. The chassis of engine 400 may include one or more slots for seating each of the mirrors. In some embodiments, mirrors 620A, 620B may not be mirrors and may alternatively be one or more optical elements to direct light, including but not limited to prisms.

In some embodiments, the first mirror 620A and second mirror 620B may be configured to be associated with the far field imaging optic 440. Alternatively, the first mirror 620A and second mirror 620B may be configured to be associated with the near field imaging optic 450. The first mirror 620A and second mirror 620B may or may not be the same size, and the size may be or may not be a portion of the size of the imaging sensor array 610.

In some embodiments with the first mirror 620A and second mirror 620B configured to be associated with the far field imaging optic 440, the first mirror 620A and the second mirror 620B may be configured to provide a periscope configuration for the far field imaging optic 440. In some embodiments, the first mirror 620A and second mirror 620B may be configured to provide a periscope configuration that divides the imaging sensor array 610 into two or more portions, such that a first portion of the imaging sensor array 610 may be associated with the far field imaging optic 440 and a second portion of the imaging sensor array 610 may be associated with the near field imaging optic 450. Such two or more portions of the imaging sensor array may be the same size as each other portion or, alternatively, the portions may be different sizes. In some embodiments, a first portion of the imaging sensor array 610 associated with a far field imaging optic 440 may be greater than a second portion of the imaging sensor array 610 associated with a near field imaging optic 450. In some further embodiments, a first portion of the imaging sensor array 610 associated with a far field imaging optic 440 may be smaller than a second portion of the imaging sensor array 610 associated with a near field imaging optic 450.

A first portion of the imaging sensor array 610 associated with a far field imaging optic 440 and a second portion of the imaging sensor array 610 associated with a near field imaging optic 450 create a split ratio in which the ratio imaging sensor array 610 split between the near field and the far field. The split ratio may be 50/50 or it may be an unequal split.

In some embodiments, the indicia reader 101 may be configured for 1D and 2D barcodes in the near field and for 1D barcodes in the far field. The split ratio may be larger in favor of the near field portion in such a configuration as the imaging sensor array 610 associated with the 2D barcodes in the near field may be required to be larger than the portion associated with only 1D barcodes in the far field.

The periscope configuration utilizes the first mirror 620A and second mirror 620B and may also utilize one or more optical elements (e.g., lenses) or filters, which may be located between the imaging sensor array 610 and the first mirror 620A, between the first mirror 620A and the second mirror 620B, and/or between the second mirror 620B and the imaging optic (e.g., far field imaging optic 440). Such additional optical elements may allow for implementing zoom or otherwise, in conjunction with the imaging optic, direct the optical axis of the imaging optic. Additionally, in some embodiments, the periscope configuration may be used for the far field imaging optic 440 to accommodate a longer focal length associated with the far field.

In some embodiments not illustrated, more than one periscope configuration may be used such that the embodiment may have more than two imaging optics, and each of the imaging optics may have its own portion of the imaging sensor array 610.

Figure 7:
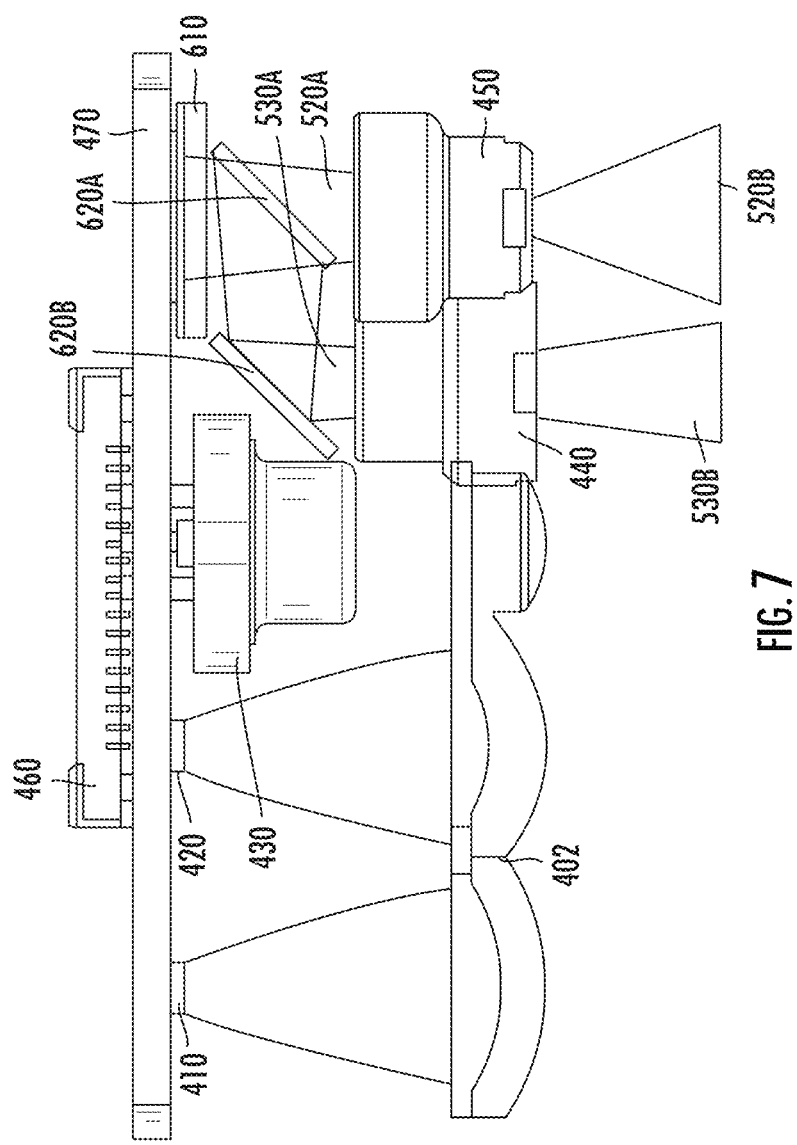
FIG. 7 illustrates a view of components of an engine for an indicia reader in accordance with example embodiments described herein.

FIG. 7 illustrates a top-down view of components of an engine 400 for an indicia reader in accordance with example embodiments described herein. In the embodiment of FIG. 7, the chassis of the engine 400 is not present and the components of the engine 400 are illustrated. FIG. 7 illustrates an embodiment where the imaging sensor array 610 is shared between the far field imaging optic 440 and the near field imaging optic 450. In particular, and is readily appreciated, the near field imaging optic 450 is positioned in front of the imaging sensor array 610 and the far field imaging optic 440 is placed adjacent to the near field imaging optic 450 with mirrors 620A, 620B configured to provide a periscope configuration for the far field imaging optic 440. The near field optical field of view is illustrated at reference 520B and the optical path for the near field imaging optic 450 from the near field imaging optic 450 to the imaging sensor array 610 is depicted at 520A. The far field optical field of view is illustrated at reference 530B and the optical path from the far field imaging optic 440 to the imaging sensor array 610 is depicted at 530A as from far field imaging optic 400 to mirror 620B to mirror 620A to imaging sensor array 610. Both optical path 520A and optical path 530A are directed to the imaging sensor array 610, though these are not overlapping optical paths due to the imaging sensor array 610 being split by these two optical paths 520A and 530A as each optical path is incident on the imaging sensor array 610.

In the embodiment illustrated in FIG. 7, the optical axes of the aimer 430, of the far field imaging optic 440, and of the near field imaging optic 450 are parallel, and these optical axes are all perpendicular to the plane of the imaging sensor array 610.

Figure 8:
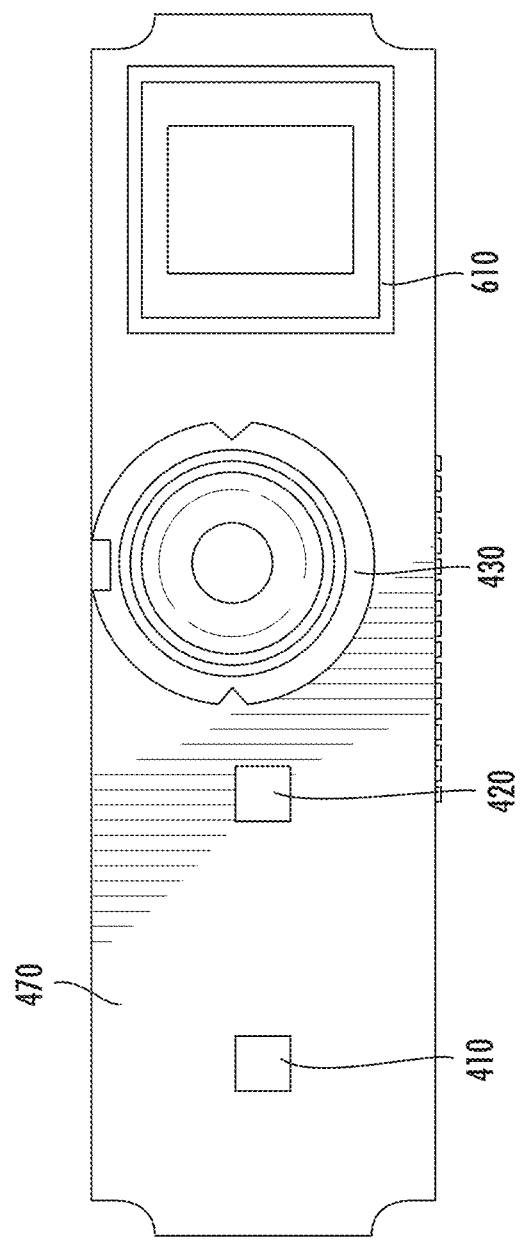
FIG. 8 illustrates an example circuit board for an indicia reader in accordance with example embodiments described herein.

FIG. 8 illustrates an example circuit board for an indicia reader in accordance with example embodiments described herein. In some embodiments, the first illumination source 410, the second illumination source 420, the aimer 430, and the imaging sensor array 610 may be mounted of the front side of PCB 470.

In some embodiments implementing the improvements described herein, the engine 400 size may be 7 mm or less in height, 24 mm or less in width, or 17 mm or less in depth.

Figure 9:
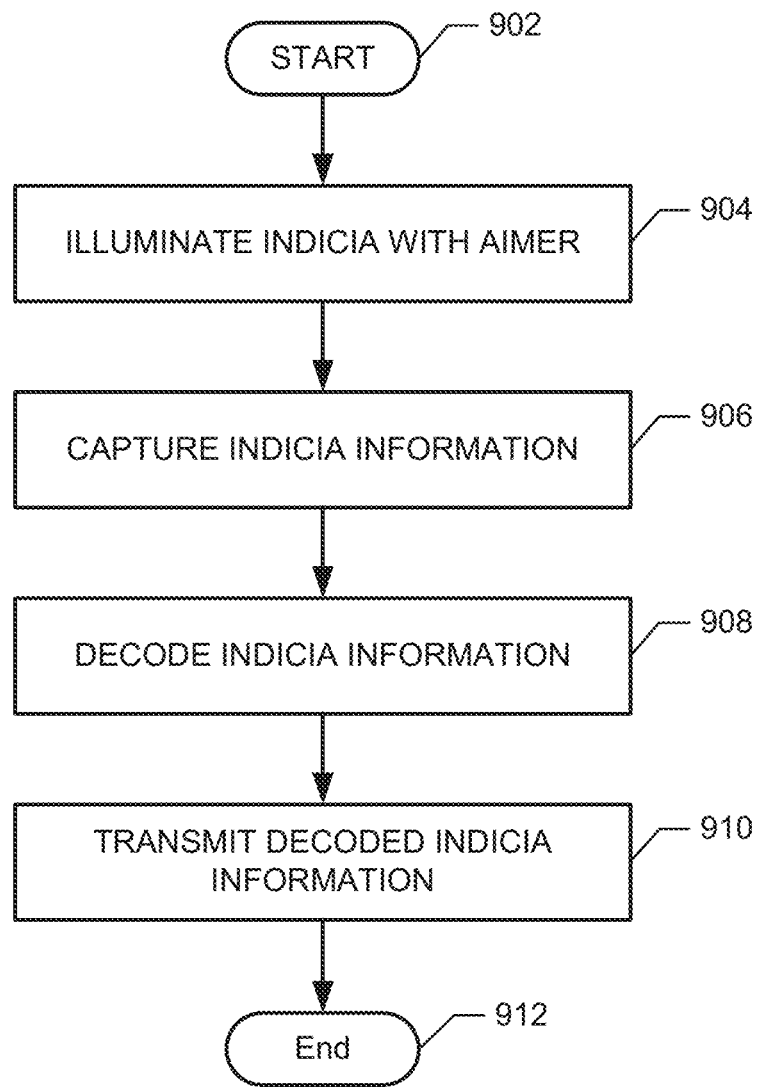
FIG. 9 illustrates an example process for an indicia reader in accordance with example embodiments described herein.

FIG. 9 illustrates an example process for an indicia reader in accordance with example embodiments described herein. In some embodiments of an indicia reader 101 with dual optics and single imaging sensor array 610, the indicia reader 101 may capture, decode, and transmit indicia imaging data or indicia information as described in FIG. 9. The process of FIG. 9 may start at 902 and may end at 912. In some embodiments, one or more operations may be omitted. Additionally, other operations may be added to the process.

At operation 904, the indicia reader 101 may illuminate an indicia 103 with the aimer 430. In some embodiments, a user of an indicia reader 101 may pull a trigger or press a button on the indicia reader causing the aimer 430 to illuminate the indicia 103 with, for example, a green laser.

At operation 906, the indicia reader 101 may capture indicia imaging data from an indicia 103. In some embodiments, once the user has aimed the indicia reader 101 at the indicia then the user may pull a trigger or press a button to cause the indicia reader to capture the indicia imaging data. Capturing indicia imaging data is further described herein.

At operation 908, the indicia reader 101 may decode the indicia imaging data into indicia information. In some embodiments, the indicia reader 101 may decode an indicia, such as but not limited to a barcode or QR code.

At operation 910, the indicia reader 101 may transmit the decoded indicia imaging data or indicia information to one or more other connected devices 120. Additionally, or alternatively, the transmission may include transmitted the captured indicia imaging data.

Figure 10:
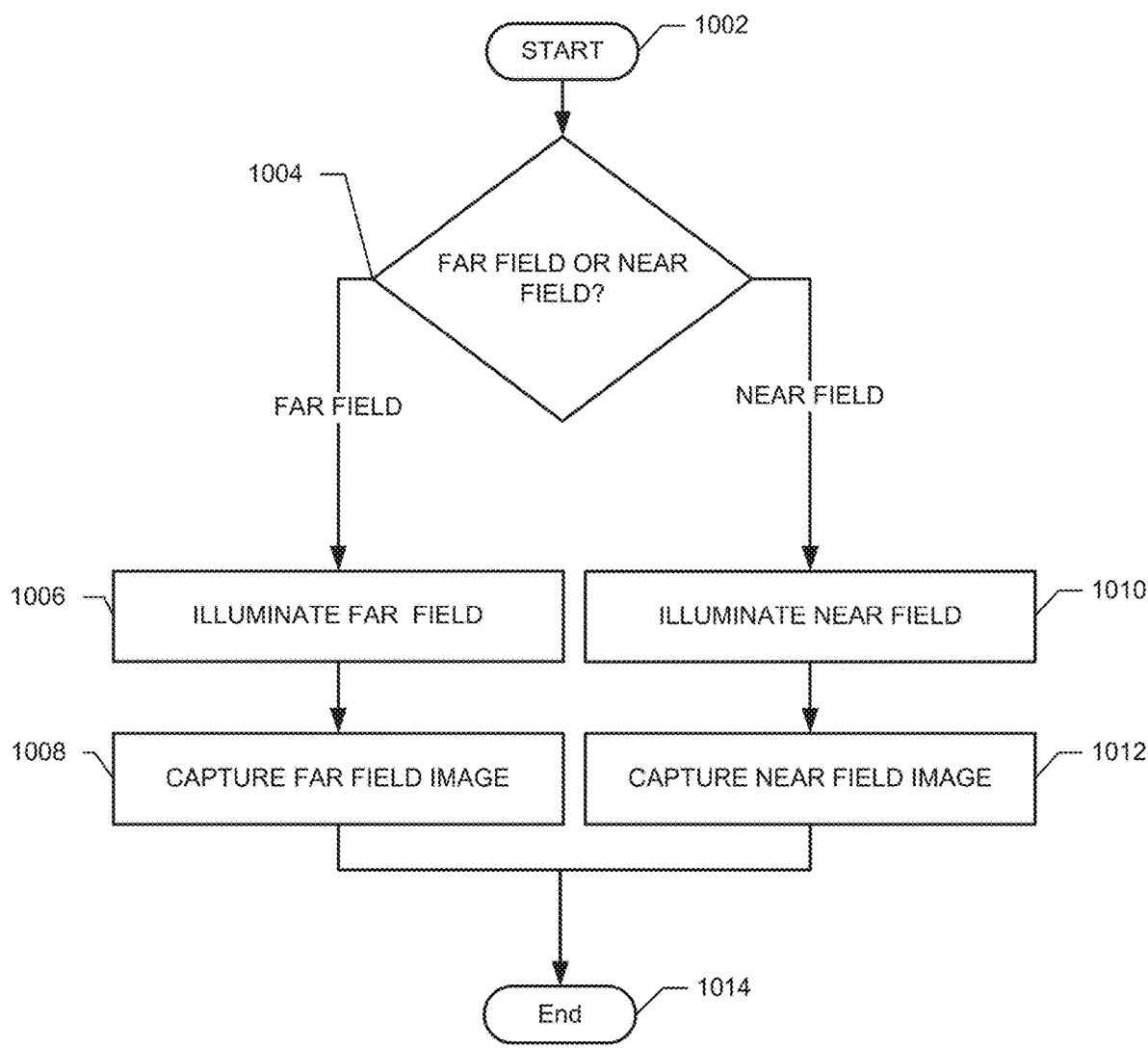
FIG. 10 illustrates an example process for an indicia reader in accordance with example embodiments described herein.

FIG. 10 illustrates an example process for an indicia reader in accordance with example embodiments described herein. In some embodiments, such as an indicia reader 101 with dual optics and single imaging sensor array 610, the indicia reader 101 may capture indicia imaging data as described in FIG. 10. The process of FIG. 10 may start at 1002 and may end at 1018. In some embodiments, one or more operations may be omitted. Additionally, other operations may be added to the process.

At operation 1004, the indicia reader 101 may determine if capturing of the indicia 103 will be done with a far field imaging optic 440 or a near field imaging optic 450. In some embodiments, the indicia reader 101 may user a ranging component (e.g., range finder) to determine a range and select either near field or field. In some embodiments, the indicia reader 101 may cycle between the near field and the far field to capture indicia imaging data. When the indicia reader 101 determines to use far field imaging optic 440 then the indicia reader proceeds to operation 1006. When the indicia reader 101 determines to use near field imaging optic 450 then the indicia reader proceeds to operation 1010.

At operation 1006, the indicia reader 101 may use a first illumination source 420 to illuminate the indicia 103. In some embodiments, the first illumination source 410 may be associated with the far field imaging optic 440. In some embodiments, the first illumination source 410 may be dedicated to operation with the far field imaging optic 440. Alternatively, some embodiments may have a first illumination source associated with both the far field imaging optic 440 and the near field imaging optic 450.

At operation 1008, the indicia reader 101 may capture indicia imaging data by capturing the far field image with the imaging sensor array 610. In some embodiments, the imaging sensor array 610 may capture the indicia imaging data from all of the pixels in the imaging sensor array 601. Alternatively, the imaging sensor array 610 may capture only those pixels associated with the portion of the imaging sensor array 610 associated with the far field imaging optic 440.

At operation 1010, the indicia reader 101 may use a second illumination source 410 to illuminate the indicia 103. In some embodiments, the second illumination source 410 may be associated with the near field imaging optic 440. In some embodiments, the first illumination source 410 may be dedicated to operation with the near field imaging optic 440. Alternatively, some embodiments may have a first illumination source associated with both the near field imaging optic 450 and the far field imaging optic 440.

At operation 1012, the indicia reader 101 may capture indicia imaging data by capturing the near field image with the imaging sensor array 610. In some embodiments, the imaging sensor array 610 may capture the indicia imaging data from all of the pixels in the imaging sensor array 601. Alternatively, the imaging sensor array 610 may capture only those pixels associated with the portion of the imaging sensor array 610 associated with the near field imaging optic 440.

Although exemplary embodiments have been described above, implementations or embodiments of the subject matter and the operations described herein can be implemented in other types of digital electronic circuitry, computer software or program, firmware, or hardware, including the structures disclosed in this specification and their structural equivalents, or in combinations of one or more of them.

Embodiments of the subject matter described herein may be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The processes described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The term "data processing apparatus" as used above encompasses all kinds of apparatus, devices, and machines for processing data, including by way of example a programmable processor, a computer, a system on a chip, or multiple ones, or combinations, of the foregoing. The apparatus may include special purpose logic circuitry, e.g., an FPGA (field programmable gate array) or an ASIC (application-specific integrated circuit). The apparatus may also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment may realize various different computing model infrastructures, such as web services, distributed computing, and grid computing infrastructures.

Computer software or computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A computer program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:
1. A dual optics indicia reader comprising:
an aimer;
a near field imaging optic;
a far field imaging optic comprising at least a first prism and a second prism;
an imaging sensor array, wherein the imaging sensor array comprises a near field portion and a far field portion, wherein the near field portion is configured to receive light through the near field imaging optic, and wherein the far field portion is configured to receive light from the far field imaging optic;
wherein the near field imaging optic, the far field imaging optic, and the aimer are arranged in a triangular arrangement.
2. The dual optics indicia reader of claim 1, wherein the first prism and the second prism are configured to provide a periscope configuration.
3. The dual optics indicia reader of claim 1, wherein an optical axis associated with the far field imaging optic, an optical axis associated with the near field imaging optic, and an optical axis associated with the aimer are parallel.
4. The dual optics indicia reader of claim 3, wherein the optical axis associated with the far field imaging optic extending from the dual optics indicia reader, an optical path associated with the near field imaging optic, and the optical path associated with the aimer are perpendicular to a plane of the imaging sensor array.
5. The dual optics indicia reader of claim 1, wherein a barrel associated with the near field imaging optic and a barrel associated with the far field imaging optic are configured in a nested configuration.
6. The dual optics indicia reader of claim 1, wherein the dual optics indicia reader further comprises a first illumination source associated with the far field imaging optic, a second illumination source associated with the near field imaging optic, and an illumination optic associated with both the first illumination source and the second illumination source.

7. The dual optics indicia reader of claim 6, wherein the illumination optic is further associated with the aimer.

8. The dual optics indicia reader of claim 1, wherein a size of the far field portion is same as a size of the near field portion.

9. The dual optics indicia reader of claim 1, wherein a size of the far field portion is less than a size of the near field portion.

10. The dual optics indicia reader of claim 1, wherein a size of the far field portion is greater than a size of the near field portion.

11. The dual optics indicia reader of claim 1, wherein a first illumination source, a second illumination source, the aimer, and the imaging sensor array are mounted to a first circuit board.

12. The dual optics indicia reader of claim 1, wherein the dual optics indicia reader is further configured to wirelessly connect to one or more connected devices.

13. A method for reading indicia, comprising:
capturing indicia imaging data from an indicia via a dual optics indicia reader, wherein the dual optics indicia reader comprises:
an aimer;
a near field imaging optic;
a far field imaging optic comprising at least a first prism and a second prism;
an imaging sensor array, wherein the imaging sensor array comprises a near field portion and a far field portion, wherein the near field portion is configured to receive light through the near field imaging optic, and wherein the far field portion is configured to receive light from the far field imaging optic
wherein the first prism and the second prism split the imaging sensor array into the far field portion and the near field portion;
wherein the near field imaging optic, the far field imaging optic, and the aimer are arranged in a triangular arrangement; and
decoding the captured indicia imaging data.

14. The method of claim 13, wherein capturing indicia imaging data comprises capturing indicia imaging data from an indicia with a portion of the imaging sensor array.

15. The method of claim 14, wherein capturing indicia imaging data further comprises reading the imaging sensor array for the portion of the imaging sensor array associated with captured indicia imaging data.

16. The method of claim 13, further comprising illuminating, prior to capturing indicia imaging data, the indicia with the aimer.

17. The method of claim 14, further comprising illuminating, after illuminating with the aimer and prior to capturing indicia imaging data, the indicia with a first illumination source.

18. The method of claim 13, further comprising transmitting the decoded captured indicia imaging data to one or more connected devices.

19. The method of claim 18, wherein the transmitting is via a wired connection.

20. The method of claim 18, wherein the transmitting is via a wireless connection.

* * * * *